Aug. 13, 1946.    R. I. SCHONITZER    2,405,719
COMBINED DOOR-HINGING, DOOR-CHECKING, AND DOOR-HOLDING DEVICE
Original Filed Aug. 2, 1940
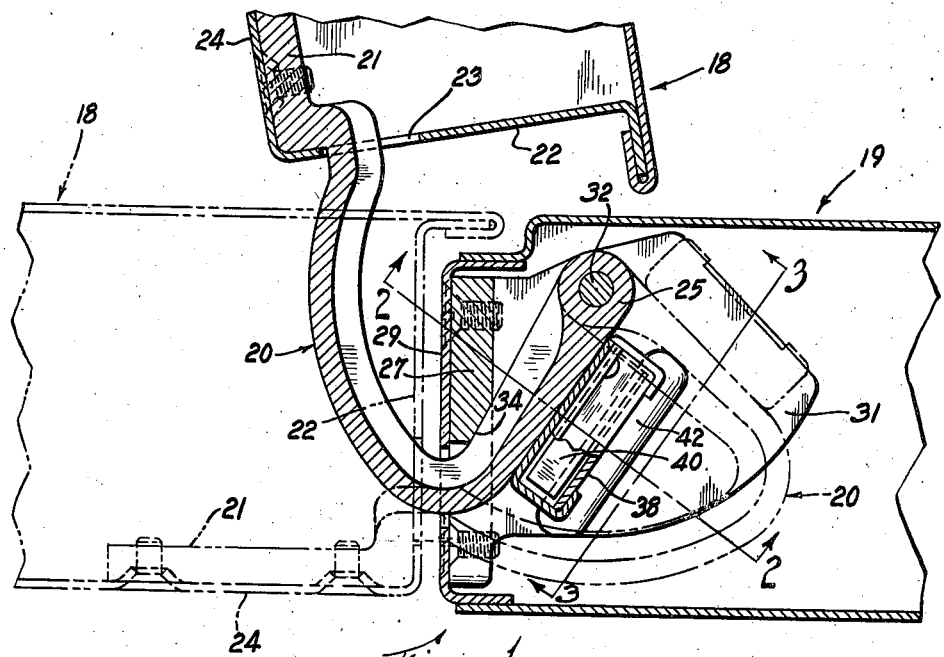
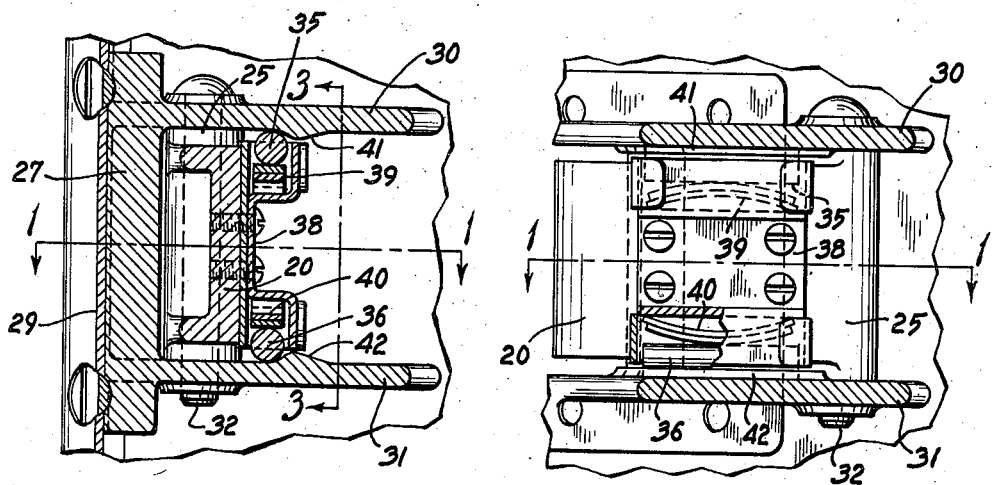
INVENTOR.
RUDOLPH I. SCHONITZER
BY Hyde and Meyer.
ATTORNEYS Patented Aug. 13, 1946

2,405,719

UNITED STATES PATENT OFFICE 2,405,719

COMBINED DOOR-HINGING, DOOR-CHECKING, AND DOOR-HOLDING DEVICE

Rudolph I. Schonitzer, Shaker Heights, Ohio

Original application August 2, 1940, Serial No. 349,888, now Patent No. 2,343,810, dated March 7, 1944. Divided and this application August 21, 1943, Serial No. 499,750

3 Claims. (Cl. 16—141)

This invention relates to combined door-hinging, door-checking and door-holding devices, the use with a door and its supporting structure of a device embodying the present invention (1) enabling said door to be hinged (by parts which are concealed when the door is closed) on its supporting structure, it being understood that one or more other hinge means generally will be used for the complete hinging of said door; (2) enabling the opening movement of said door to be checked or arrested when said door reaches the position desired for its fully open position; and (3) enabling said door to be releasably held or retained against closing from a predetermined open position, such as the fully open position of said door.

The present invention has for its general objects the provision of a device of the character described by which two or all three of the aforesaid functions may be effectively accomplished, the construction of such device and the arrangement of its parts being such that said device may be inexpensively manufactured and easily assembled with a door and its supporting structure.

Although the field of use of the present invention obviously is not limited to automobile doors, devices embodying such invention are particularly useful therewith, as will hereinafter appear.

More specific objects of the present invention are in part obvious and in part will appear more in detail hereafter.

The present invention will be readily understood from the following description of one embodiment thereof as used with an automobile door, reference being had to the accompanying drawing in which Fig. 1 is a longitudinal horizontal sectional view through the hinge edge portion of an automobile door and a corresponding portion of the automobile body on which said door is hinged by the use of a device embodying the present invention, the view being on the line 1—1, Figs. 2 and 3, the door being shown in full lines in its fully open position, the position in which it is releasably held or retained by such device, and the closed position of said door being indicated in dot-dash lines;

Fig. 2 is a detail vertical sectional view, on the line 2—2, Fig. 1; and

Fig. 3 is a detail vertical sectional view, on the line 3—3, Figs. 1 and 2.

Before the present invention is described in detail, it is to be understood that such invention is not limited to the details of construction or the specific arrangement of parts herein illustrated or described, as the invention obviously may take other forms. It also is to be understood that the phraseology or terminology herein employed is for the purpose of description and not of limitation.

In the accompanying drawing, wherein is illustrated one form of device embodying the present invention, the reference numeral 18 designates a generally hollow sheet metal automobile door, such as is now in general use, and of which door only the hinge edge portion is here shown; and 19 designates the automobile body portion (hereinafter termed a body pillar) on which said door is hinged by said device, it being understood that other hinge means (not here shown) generally will be used in conjunction with the present device for the complete hinging of said door on said body pillar.

As best shown in Fig. 1, the device constituting the herein illustrated embodiment of the present invention includes a hinge leaf 20 of the so-called goose neck form, one end of said hinge leaf being pivotally secured to or associated with the body pillar 19 and the other end of said hinge leaf being rigidly or immovably secured to or associated with the door 18. As a result, said door not only is supported on said body pillar (and in the appended claims, said body pillar is designated as a supporting structure for the door structure hinged thereon) but also, is free to swing about its hinge axis (to be later referred to) between its fully closed position, indicated in dot-dash lines in Fig. 1, and its fully open position, shown in full lines in Fig. 1, all as will be readily understood.

As here shown, the rigidly secured end portion 21 of the hinge leaf 20 lies within the hinge edge portion of the door 18 (the hinge edge wall 22 of said door being provided with a suitable opening 23 to receive such end portion of said hinge leaf) and is screwed or otherwise immovably secured to the sheet metal inner side wall 24 of said door, said door being provided, as is usual, with a suitable trim panel or the like (not shown) by which its inner side wall 24 is desirably covered. For the pivotal connection of the other end 25 of said hinge leaf to the body pillar 19, a suitable metal bracket, of generally U shape in vertical section, is here utilized, said bracket being arranged within said body pillar and having its generally vertical base 27 screwed or otherwise rigidly secured to the body pillar hinge edge wall 29, said bracket base and said body pillar wall being provided with aligned apertures or openings for the extension therethrough of said hinge leaf. Extending through rearwardly disposed, vertically spaced and substantially horizontal lugs 30 and 31 of said bracket is a pintle 32 upon which said hinge leaf is pivotally mounted, the upper bracket lug 30 being spaced sufficiently from the lower bracket lug 31 to permit said hinge leaf to swing therebetween as the door 18 is opened and closed.

Although the opening movement of said door may be checked or arrested in various ways by the device constituting this embodiment of the present invention, when said door reaches the position desired for its fully open position (the full line position of said door in Fig. 1) the checking or arresting of said door is here effected by the engagement of the hinge leaf 20 with the bracket base 27, as clearly indicated in Fig. 1. If desired and as here shown, the portion 34 of said bracket base which constitutes the cooperating abutment for said hinge leaf, in checking or arresting the opening movement of the door 18, may be of inclined or bevelled character to enable it to more effectively contact and cooperate with said hinge leaf in the accomplishment of this door-checking or door-arresting function.

For the releasable retention of the door 18 in its fully open position, whenever it is moved thereto, the device constituting this embodiment of the present invention includes one or more retaining parts and one or more retainable parts, the cooperation of which, when said door is in its fully open position, effecting its releasable retention, as will hereinafter more fully appear.

As here shown, the retaining parts of the present device comprise a pair of vertically spaced elongated rollers 35 and 36, which are carried by the hinge leaf 20 and which forcibly engage at all times the upper and lower bracket lugs 30 and 31, the upper roller 35 having engagement with the under surface of the upper bracket lug 30 and the lower roller having engagement with the top surface of the lower bracket lug 31, as best indicated in Fig. 2. For the mounting of said rollers on said hinge leaf, a sheet metal casing 38 is here utilized, said casing being screwed or otherwise rigidly secured to the generally flat rear surface of that portion of said hinge leaf which is adjacent its pivot 32 and containing suitable resilient means, such as the leaf springs 39 and 40 here shown, for normally urging said rollers divergently into engagement with the upper and lower bracket lugs 30 and 31. The retainable parts here utilized for cooperation with the rollers 35 and 36 in releasably holding the door 18 in its fully open position comprise a pair of projections 41 and 42, one (designated by the reference numeral 41) depending from the under surface of the upper bracket lug 30 for cooperation with the upper roller 35 and the other projection (designated by the reference numeral 42) extending upwardly from the upper surface of the lower bracket lug 31 for cooperation with the lower roller 36.

During opening movement of the door 18, the hinge leaf 20 swings in a clockwise direction (Fig. 1) between the upper and lower bracket lugs 30 and 31, the rollers 35 and 36 carried by said hinge leaf travelling along said bracket lugs, as will be readily understood. Just before said door reaches its fully open position, said rollers strike the projections 41 and 42 of said bracket lugs and as said rollers pass between said projections, the rollers are moved thereby convergently or toward each other against the divergent forces of their leaf springs 39 and 40. As said door reaches its fully open position (and further opening movement of said door is effectively prevented by the engagement of the hinge leaf 20 with the abutment portion 34 of the bracket base 27), the rollers 35 and 36 move divergently under the influence of their leaf springs in front or ahead of said bracket lug projections, with the consequent releasable retention of said door in its fully open position, although return or closing movement of said door may be readily effected, all as will be readily understood.

To those skilled in the art to which the present invention relates, other features and advantages of devices embodying such invention will be evident from the foregoing description of one such embodiment.

The present application is a division of my copending application for Combined door-hinging, door-checking and door-holding devices, Serial No. 349,888, filed August 2, 1940, United States Patent No. 2,343,810 having issued on such application on March 7, 1944.

What I claim is:

1. A combined door-hinging and door-holding device, comprising hinge leaf means for rigid securement to a door and for pivotal securement to the supporting structure for said door, a pair of spaced members carried by said supporting structure and between which said hinge leaf means swings during opening and closing movement of said door, a pair of spaced rollable means engageable at all times with said spaced members and cooperable with parts thereof in releasably holding said door from closing from a predetermined open position, a carrier plate for said rollable means having an intermediate portion secured to said hinge leaf means and having end portions offset from said hinge leaf means to provide sockets for said rollable means, and resilient means in said sockets and engageable with said rollable means for resiliently maintaining said rollable means in engagement with said spaced members.

2. A combined door-hinging and door-holding device, comprising hinge leaf means for rigid securement to a door and for pivotal securement to the supporting structure for said door, a pair of spaced members carried by said supporting structure and between which said hinge leaf means swings during opening and closing movement of said door, a pair of spaced rollable means engageable at all times with said spaced members and cooperable with parts thereof in releasably holding said door from closing from a predetermined open position, a casing for said rollable means carried by said hinge leaf means and comprising inner and outer plates having their intermediate portions in contact and their end portions in spaced relation to provide sockets for said rollable means, and resilient means in said sockets and engageable with said rollable means for resiliently maintaining said rollable means in engagement with said spaced members.

3. A combined door-hinging and door-holding device, comprising hinge leaf means for rigid securement to a door and for pivotal securement to the supporting structure for said door, a pair of spaced members carried by said supporting structure and between which said hinge leaf means swings during opening and closing movement of the door, a pair of spaced rollable means cooperable with said spaced members in releasably holding the door from closing from a predetermined open position, carrier means for said rollable means and having an intermediate portion secured to said hinge leaf means and having end portions offset from said hinge leaf means to provide sockets for said rollable means, and resilient means in said sockets and engageable with said rollable means for normally urging said rollable means toward the general planes of said spaced members.

RUDOLPH I. SCHONITZER.